(12) United States Patent
Nishimura

(10) Patent No.: US 7,567,733 B2
(45) Date of Patent: Jul. 28, 2009

(54) IMAGE RESOLUTION CONVERSION APPARATUS

(75) Inventor: Hisashi Nishimura, Tokyo (JP)

(73) Assignee: Olympus Corporation, Tokyo (JP)

( * ) Notice: Subject to any disclaimer, the term of this patent is extended or adjusted under 35 U.S.C. 154(b) by 95 days.

(21) Appl. No.: 11/700,951

(22) Filed: Feb. 1, 2007

(65) Prior Publication Data

US 2007/0183687 A1   Aug. 9, 2007

(30) Foreign Application Priority Data

Feb. 6, 2006   (JP) .............................. 2006-028275

(51) Int. Cl.
*G06K 9/32* (2006.01)
(52) U.S. Cl. ................................... 382/300
(58) Field of Classification Search .......... 382/298–300
See application file for complete search history.

(56) References Cited

U.S. PATENT DOCUMENTS

| 6,782,143 | B1 | 8/2004 | Dube et al. |
| 2004/0234165 | A1* | 11/2004 | Lee .............................. 382/300 |
| 2007/0104394 | A1* | 5/2007 | Chou .......................... 382/300 |

FOREIGN PATENT DOCUMENTS

| EP | 0 979 004 A2 | 2/2000 |
| EP | 1 304 650 A1 | 4/2003 |
| JP | 2001-238073 A | 8/2001 |
| JP | 2005-341337 A | 12/2005 |
| WO | 94/10679 A1 | 5/1994 |

OTHER PUBLICATIONS

Search Report dated Jul. 23, 2008 issued in corresponding European Application No. 07 002 310.6.

* cited by examiner

*Primary Examiner*—Vikkram Bali
*Assistant Examiner*—Max Shikhman
(74) *Attorney, Agent, or Firm*—Westerman, Hattori, Daniels & Adrian, LLP.

(57) ABSTRACT

In an image resolution conversion apparatus, a region-determining section establishes an initial value used for determining a region where a new pixel is to be generated based on the number of pixels in a non-line direction included in a pixel group used for converting the resolution attribute of fields, and a resolution conversion magnification ratio. The region-determining section accumulates an integration parameter corresponding to the resolution conversion magnification ratio onto the obtained initial values under the predetermined condition. The region-determining section outputs: a region-control signal; and the newly-established-pixel-position signal, successively based on the accumulation result.

2 Claims, 13 Drawing Sheets

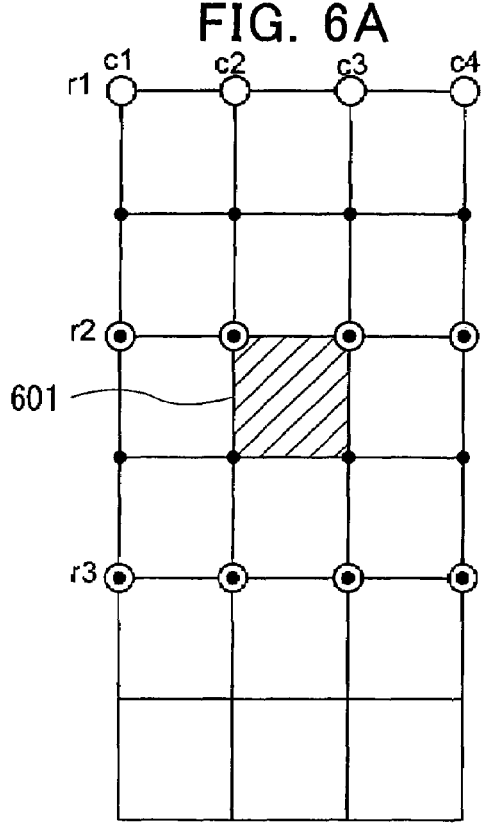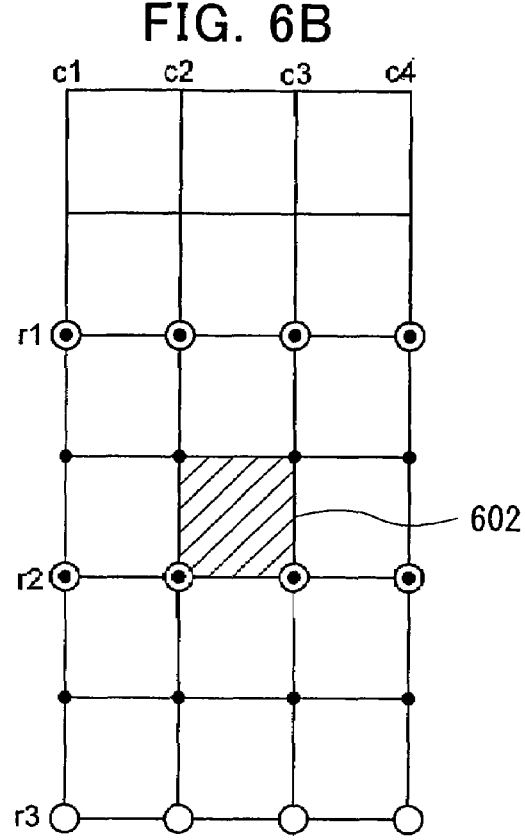

IMAGE RESOLUTION CONVERSION APPARATUS

The present application claims priority on patent application No. 2006-028275 filed in Japan Feb. 6, 2006, the content of which is incorporated herein by reference.

BACKGROUND OF THE INVENTION

1. Field of the Invention

The present invention relates to an image resolution conversion apparatus and, more particularly, the present invention relates to an image resolution conversion apparatus, preferable for converting the resolution of an original image having pixel values by an arbitrary magnification ratio, for generating new pixel values in newly set pixel positions.

2. Description of the Related Art

A conventional technique for converting the resolution of an image is disclosed, for example, in Japanese Unexamined Patent Application, First Publication No. 2001-238073. The conventional technique will be explained with reference to FIG. 18. According to the method proposed in the publication, a new-pixel-generating region is surrounded by the original 2 lines by 2 columns of image pixels forming a rectangle; and a group of 4 lines by 4 columns of sixteen pixels of original image, including these four pixels and surrounding pixels in neighboring lines and columns are used for calculating the newly generated pixel. The pixel values of the newly generated pixels are calculated based on the pixel values of the 4 lines by 4 columns of sixteen pixels by a cubic interpolation process, etc.

Although converting the resolution of an interlaced image per frame unit is advantageous from an image quality point of view, this method is subject to more than one field of delay. From a real time process point of view, processing per field unit is more desirable where no delay is allowed.

The method proposed by Japanese Unexamined Patent Application, First Publication No. 2001-238073 uses a pixel group including 4 lines by 4 columns of sixteen pixels in the original image for generating a new pixel. However, using this method for processing the interlaced image per unit field causes the following significant change in the distribution range of a pixel group with respect to a line direction and a column direction.

FIG. 19 illustrates how it changes. Round spots indicate pixel positions of an original image viewed in a field unit of an interlaced image. Cross points of grid lines indicate pixel positions of the original image obtained by viewing two integrated fields. An interval of columns corresponds to one pixel and an interval of lines corresponds to two pixels since data do not exist in every one line when viewing two interlaced images per field unit. That is, the range of unit field including 4 lines by 4 columns corresponds to a frame including integrated fields consisting of 7 lines by 4 columns.

SUMMARY OF THE INVENTION

The present invention provides an image resolution conversion apparatus for converting an original image into an image having a resolution corresponding to by a preset resolution conversion magnification ratio by generating a new pixel by interpolating pixel values relating to a plurality of pixels included in a pixel group forming a predetermined size of a pixel region, the apparatus comprising: a pixel-values storage section for storing the pixel values of each interlaced input original image as a unit of an interlaced field; a region-determining section for setting initial values used for determining a new-pixel-generating region; accumulating onto the initial values integration parameters corresponding to the resolution conversion magnification ratio successively under a predetermined condition; and outputting a first determination signal and a second determination signal successively based on the accumulation results so that the initial values are set based on the number of pixels in the pixel group in the non-line direction orthogonal to the line direction of the interlace, the attributes of fields, and the resolution conversion magnification ratio, the first determination signal relating to the position of the new-pixel-generating region for generating the new pixel, and the second determination signal relating to the position of the new pixel in the new-pixel-generating region; a pixel-values-reading control section for generating an output-control signal based on the first determination signal so that the output-control signal allows the pixel values of the pixel group corresponding to the new-pixel-generating region to be output from the pixel-values storage section; and an arithmetic interpolating section for calculating interpolated pixel values of the new pixel corresponding to the resolution conversion magnification ratio based on the pixel values of the pixel group and the second determination signal, the pixel values being output from the pixel-values storage section in accordance with the output-control signal.

The present invention also provides an image resolution conversion apparatus in which the number of pixels in the pixel group in the non-line direction is the sum of 1 and a quotient obtained by dividing the number of pixels in line directions by 2; and the pixel-values storage section collectively outputs pixel values of the pixel group corresponding to the number of a product of the number of pixels in a line direction and the number of pixels in a non-line direction.

The present invention also provides an image resolution conversion apparatus so that the region-determining section can establish an intermediate position parameter indicating an intermediate position between pixels adjacent in the non-line direction to each other in the field and generates initial values and a second determination signal based on an intermediate position parameter.

BRIEF DESCRIPTION OF THE DRAWINGS

FIGS. 6A and 6B explain, for reference, an axiom of an image resolution and conversion (where a pixel group of an original image is based on 4 lines by 4 columns) according to the embodiment of the present invention.

DETAILED DESCRIPTION OF THE INVENTION

Figure 1:
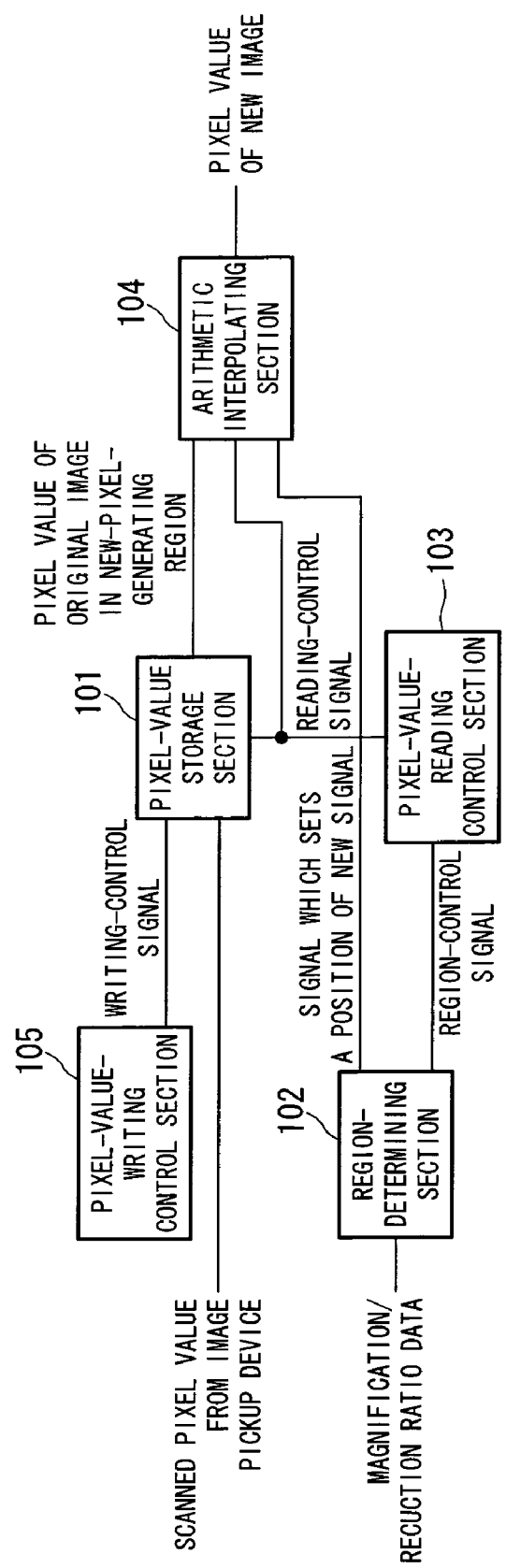
FIG. 1 is a block diagram of an image resolution conversion apparatus according to an embodiment of the present invention.

Embodiments of the present invention will be explained below with reference to the drawings. To start with, an axiom of image resolution conversion according to the present embodiment will be explained. The idea of using a group of 4 lines by 4 columns of sixteen pixels included in an original image will be explained in the present embodiment for generating a new pixel. FIGS. 6A and 6B illustrating a focused field are considered to include a non-existent because intervals of pixels both in the focused field and the other field are identical with respect to a line direction (a horizontal direction in the drawing) and a non-line direction (a vertical direction in the drawing).

As illustrated in FIGS. 6A and 6B, the two regions 601 and 602, where a new pixel is generated, surrounded by 2 lines by 2 columns of four pixels include a position of a non-existent in the focused field. Black round spots indicating 4 lines by 4 columns of sixteen pixels shown in the two regions 601 and 602 are used for generating a new pixel. Although a new pixel must be generated based on the pixel group of sixteen pixels, the focused field includes a non-existent. Such a non-existent can be indicated by means of pixel values of existing pixels by interpolating adjacent existing pixels.

Figure 7:
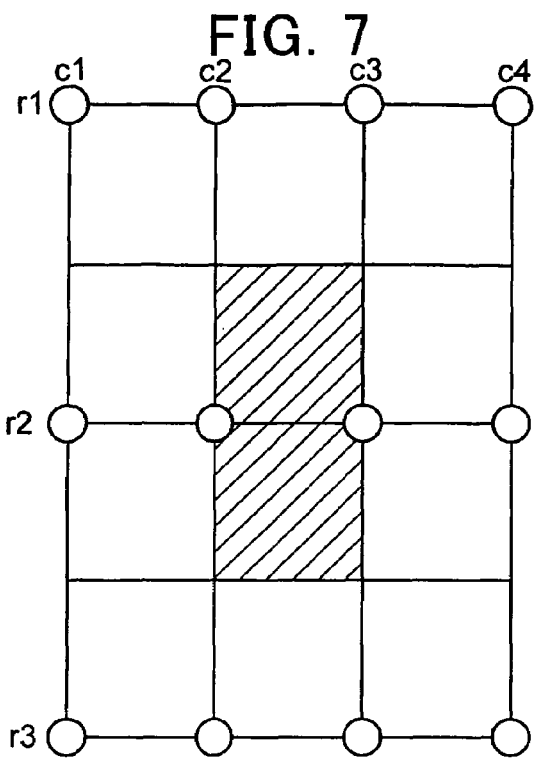
FIG. 7 explains, for reference, an axiom of an image resolution and conversion (where a pixel group of an original image is based on 4 lines by 4 columns) according to the embodiment of the present invention.

Therefore, 3 lines by 4 columns of twelve pixels indicated by white round spots shown in respective drawings represent a pixel group of an original image used for generating a new pixel in a new-pixel-generating region. A line number M (number of pixels in a non-line direction) with respect to a line number N of the pixel group is obtained by a formula $M=N/2+1$ since the line interval is double the column interval. Separate pixel groups of an original image are used for generating a new pixel in this case based on the conventional method for dividing a region (where a new pixel is generated) into two regions. FIG. 7 illustrates two regions (where a new pixel is generated) where pixel groups used for generating a new pixel are identical.

Figure 8:
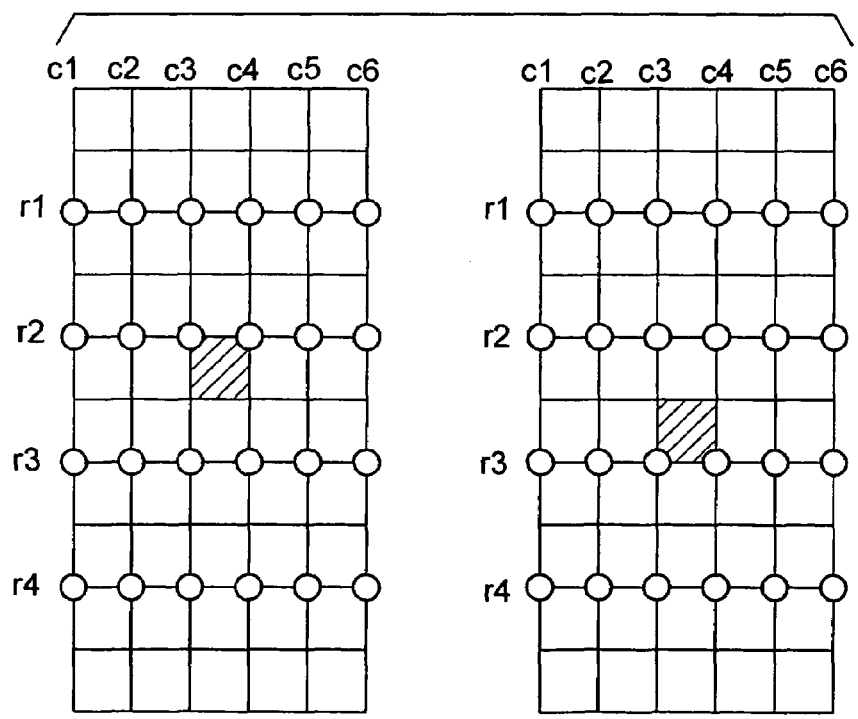
FIG. 8 explains, for reference, an axiom of an image resolution and conversion (where a pixel group of an original image is based on 6 lines by 6 columns) according to the embodiment of the present invention.
Figure 9:
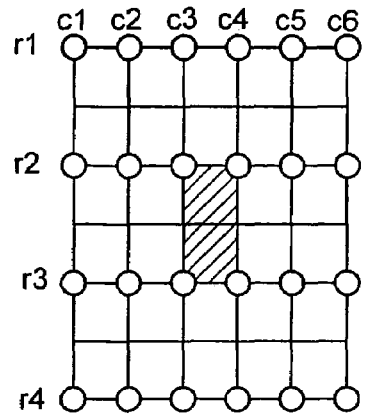
FIG. 9 explains, for reference, an axiom of image resolution and conversion (where a pixel group of an original image is based on 6 lines by 6 columns) according to the embodiment of the present invention.
Figure 10:
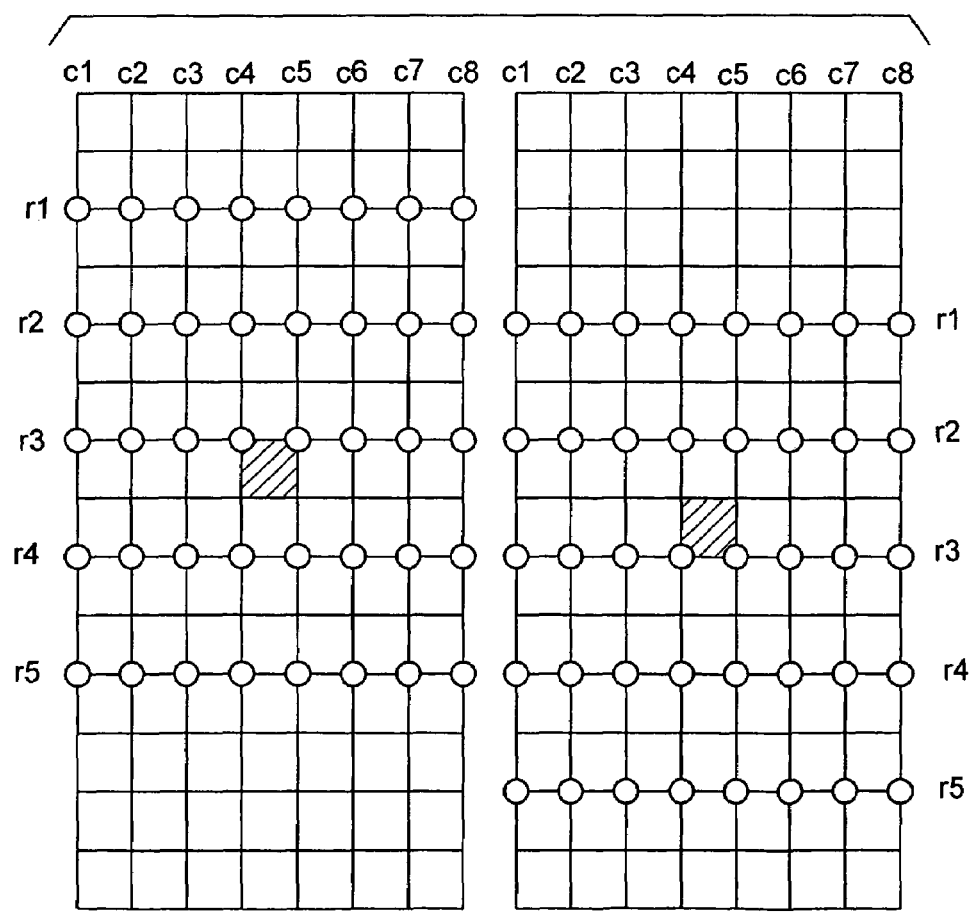
FIG. 10 explains, for reference, an axiom of image resolution and conversion (where a pixel group of an original image is based on 8 lines by 8 columns) according to the embodiment of the present invention.
Figure 11:
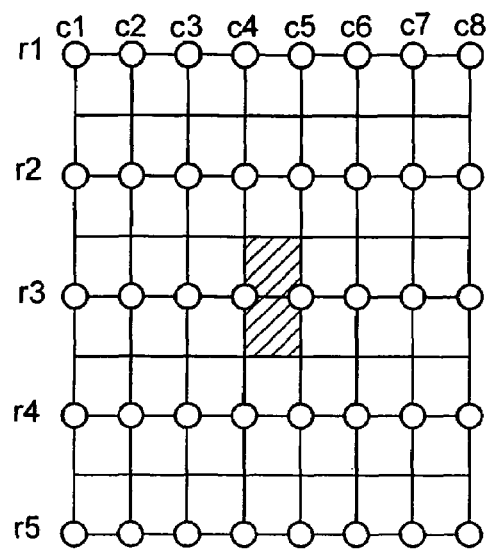
FIG. 11 explains, for reference, an axiom of image resolution and conversion (where a pixel group of an original image is based on 8 lines by 8 columns) according to the embodiment of the present invention.

Similarly, FIGS. 8 to 11 illustrate examples using 4 lines by 6 columns and 5 lines by 8 columns based on the fact that a pixel group of an original image generates a new pixel. FIG. 8 illustrates a pixel group based on 4 lines by 6 columns configured to correspond to the pixel group based on the 3 lines by 4 columns as illustrated in FIGS. 6A and 6B. FIG. 9 illustrates a pixel group based on 4 lines by 6 columns configured to correspond to the pixel group based on the 3 lines by 4 columns as illustrated in FIG. 7. Similarly, FIG. 10 illustrates a pixel group based on 5 lines by 8 columns configured to correspond to the pixel group based on the 3 lines by 4 columns as illustrated in FIGS. 6A and 6B. FIG. 11 illustrates a pixel group based on 5 lines by 8 columns configured to correspond to the pixel group based on the 3 lines by 4 columns as illustrated in FIG. 7. In view of a field unit, the pixel group of an original image based on 6 lines by 6 columns may provide a new pixel from a pixel group of an original image indicated by 4 lines by 6 columns of white round spots. The pixel group of an original image based on 8 lines by 8 columns viewed in a field unit may provide a new pixel from a pixel group of an original image indicated by 5 lines by 8 columns.

The even number of pixels in a line direction, i.e., the even number of pixel groups explained in the above helps to facilitate the process because the new-pixel-generating region is disposed between the existing pixels viewed in a line direction.

An image resolution conversion apparatus according to the present embodiment for generating a new pixel in the above-explained new-pixel-generating region will be explained in next. FIG. 1 is a schematic diagram of the image resolution conversion apparatus according to the present embodiment. Hereafter, a horizontal direction indicates the above-explained line direction and a vertical direction indicates the above-explained non-line direction in the present embodiment. The image resolution conversion apparatus comprises a pixel-values storage section 101, a region-determining section 102, a pixel-values-reading control section 103, an arithmetic interpolating section 104, and a pixel-values-writing control section 105.

The pixel values of a scanned original image raster-scanned by means of an image-pickup element such as a CCD (Charge Coupled Device) is written in the pixel-values storage section 101 in accordance with a writing-control signal output from the pixel-values-writing control section 105. Accordingly, the pixel values of each pixel of the interlaced original image are stored in the pixel-values storage section 101 as a unit of an interlaced field.

The region-determining section 102 supplies a region-control signal (first determination signal) for determining a region where a new pixel is established to the pixel-values-reading control section 103 based on a magnification/reduction ratio data supplied externally, and simultaneously supplies a newly-established-pixel-position signal (second determination signal), which indicates a position of a newly established pixel in the new-pixel-generating region, to the arithmetic interpolating section 104.

The pixel-values-reading control section 103 generates a reading-control signal (output-control signal) from the supplied region-control signal and supplies the reading-control signal to the pixel-values storage section 101. This reads the values of the pixels of the original image in the new-pixel-generating region where a pixel is newly established from the pixel-values storage section 101 and supplies the readout values to the arithmetic interpolating section 104. The arithmetic interpolating section 104 generates an interpolation coefficient based on the newly-established-pixel-position signal and outputs a new pixel value having converted the resolution corresponding to magnification/reduction ratio data by multiplying the interpolation coefficient by the pixel values of the original image supplied from the pixel-values storage section 101.

Figure 2:
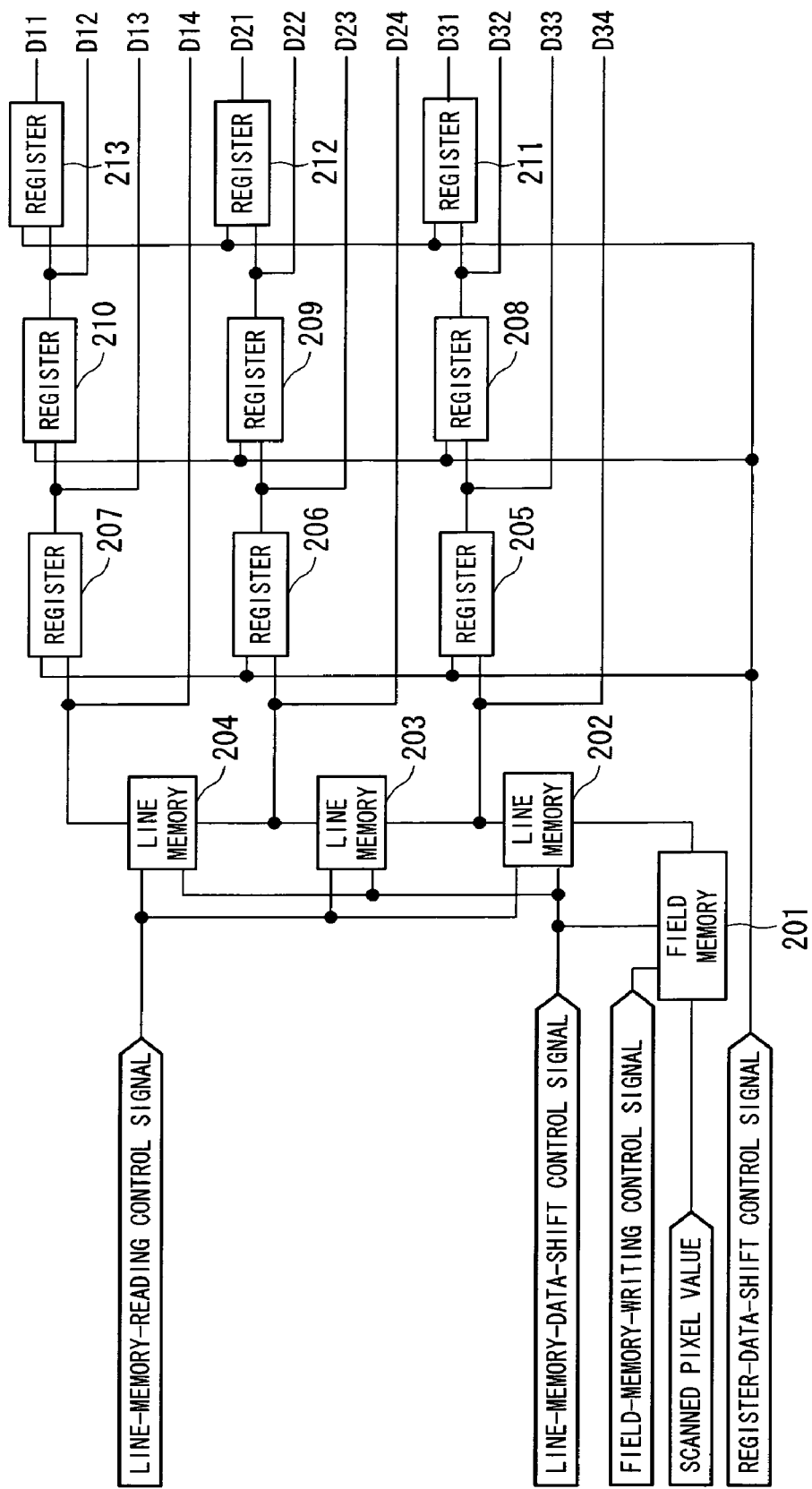
FIG. 2 is a block diagram of a pixel-values storage section provided in the image resolution conversion apparatus according to the embodiment of the present invention.

The pixel-values storage section 101 will be explained in detail in next. FIG. 2 illustrates the configuration of the pixel-values storage section 101. This configuration is based on an idea in which a pixel group of an original image surrounding a region where a new pixel is established consists of 4 lines by 4 columns of pixels, and will be explained with reference to a case where the number of lines is set at three ((4/2)+1=3) while the number of column is four, and the pixel group consists of 3 lines by 4 columns of twelve pixels.

The pixel-values storage section 101 comprises a field memory 201 for storing pixel values of an original image raster-scanned by an image-pickup element, a plurality of line memories 202 to 204 (three in the present embodiment) for storing the pixel values of the original image as a line unit, and a plurality of registers 205 to 213 (nine in the present embodiment) for maintaining one of the pixel values of the original image.

The pixel values of raster-scanned original-image scanned by means of an image-pickup element such as a CCD are stored in the field memory 201 in the raster-scanned order based on a writing-control signal (field-memory-writing control signal in FIG. 2) supplied from the pixel-values-writing control section 105. The field memory 201 stores the image data corresponding to one displayed image. The storing of the data is conducted synchronously with a timing of, for example, the raster-scanning.

The reading-control signal supplied here from the pixel-values-reading control section 103 consists of a line-memory-data-shift control signal, a line-memory-reading control signal, and register-data-shift control signal as illustrated in FIG. 2. Each signal is supplied to the corresponding field memory 201, the line memories 202 to 204, and the registers 205 to 213. Shifting of the stored data between the field memory 201 and the line memories 202 to 204 are conducted based on the line-memory-data-shift control signal. Imparting the reading address onto the line memories 202 to 204 and reading out of the data on preferable positions on a line are conducted based on the line-memory-reading control signal. Shifting of the stored data between the registers 205 to 213 is conducted based on the register-data-shift control signal.

Operations conducted in the pixel-values storage section 101 illustrated in FIG. 2 will be explained in next. For example, in a case where a new pixel is established from a group of 3 lines by 4 columns of twelve original image pixels, one line of an image stored in the field memory 201 is read out based on the line-memory-data-shift control signal and stored in the line memory 202. Simultaneously, the data stored in the line memory 202 are read at a shift-control timing based on the line-memory-data-shift control signal and stored in the line memory 203, and the data stored in the line memory 203 are stored in the line memory 204; thus, the data corresponding to one line are shifted successively. As a result, the pixel values corresponding to the three focused horizontal lines are stored in the line memories 202 to 204.

The pixel values of rightmost pixels on the horizontal line in the group of 3 lines by 4 columns stored in each of the line memories 202 to 204 are output to addresses designated in accordance with the line-memory-reading control signal, and the output pixel values are stored in the registers 205 to 207 in the first line in accordance with the register-data-shift control signal. Simultaneously, the data stored in the registers 205 to 207 in the first column are stored in the registers 208 to 210 in the second column, and the data stored in the registers 208 to 210 in the second column are stored in the registers 211 to 213 in the third column; thus, data stored on the lines are shifted successively. As a result, the pixel values of the group of 3 lines by 4 columns of pixels are obtained simultaneously because the pixel values corresponding to four columns per each line can be obtained from the line memories and the registers.

Figure 12:
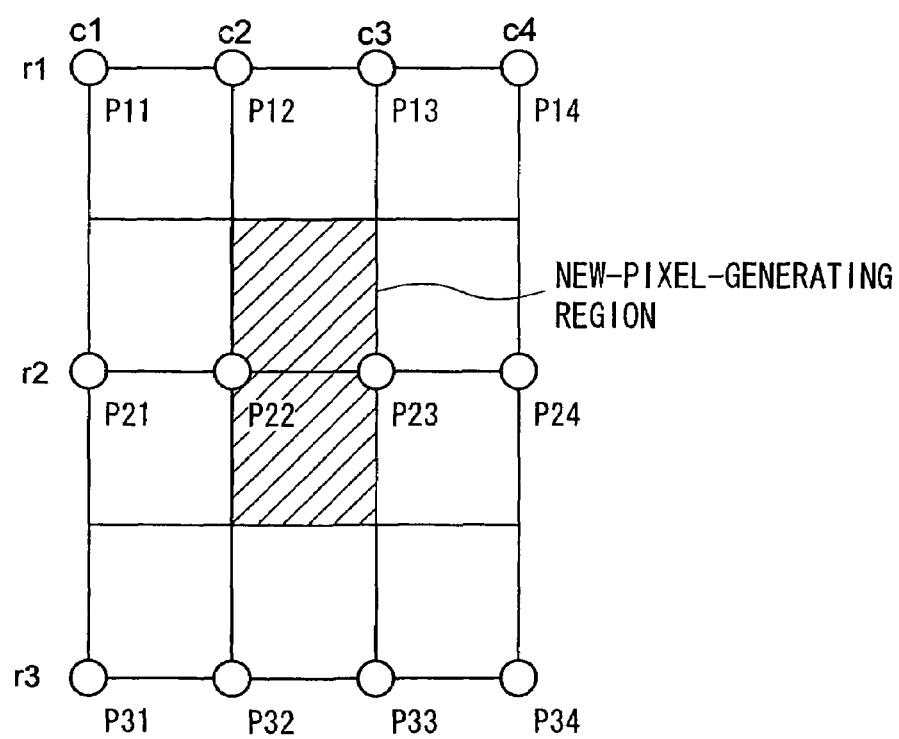
FIG. 12 illustrates, for reference, a configuration of a group of twelve original image pixels allocated in 3 lines by 4 columns and surrounding a new-pixel-generating region according to the embodiment of the present invention.

Pixel values D11, D12, D13, D14, D21, D22, D23, D24, D31, D32, D33, D34 can thus be obtained simultaneously corresponding to the group of 3 lines by 4 columns of twelve original image pixels (hereinafter referred to as P11, P12, P13, P14, P21, P22, P23, P24, P31, P32, P33, P34) surrounding the new-pixel-generating region as illustrated in FIG. 12 (it should be noted that the pixel value of a pixel Pmn is indicated as Dmn. "mn" indicates an interger). A new pixel is generated in an arbitrary position in a region surrounded by four middle points formed between P12 and P22, between P13 and P23, between P22 and P32, and between P23 and P33. Twelve pixels around the new-pixel-generating region in the original image are determined, and the pixel values of one new pixel are calculated by interpolating the pixel values of twelve pixels of the original image.

Figure 13:
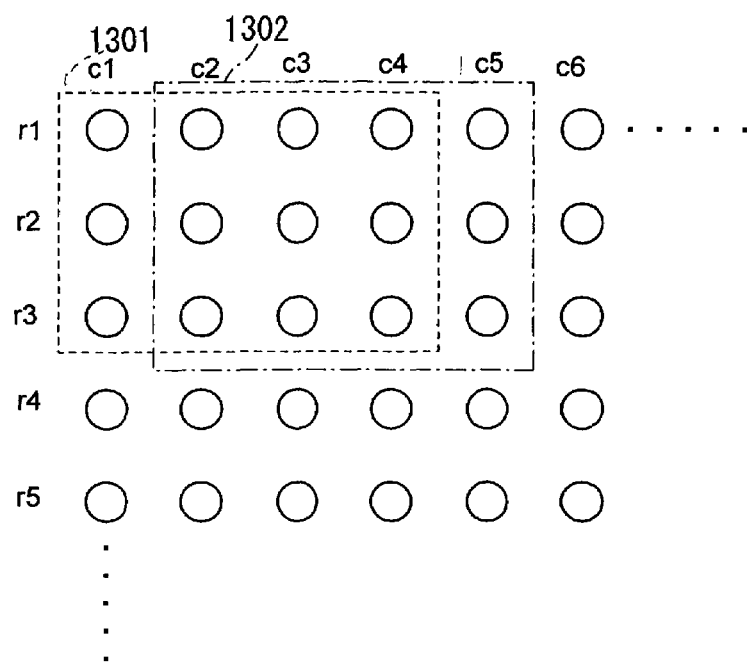
FIG. 13 illustrates, for reference, how to set regions in the case of 12-point-interpolation according to the embodiment of the present invention.

As shown in FIG. 13, after a region including 3 lines by 4 columns of the first twelve pixels of the original image (pixels in a region 1301 indicated as "○") is set for the interpolation calculation (obtaining the original pixels used for the interpolation), the setting of the region is shifted to 3 lines by 4 columns of the next twelve pixels (pixel of a region 1302) based on the region-movement-command signal (a horizontal-region-movement-command signal and a vertical-region-movement-command signal to be explained later). The number of pixels to be newly generated varies depending on the magnification ratio. The region-movement-command signal is produced based on the number of generated pixels.

Figure 14:
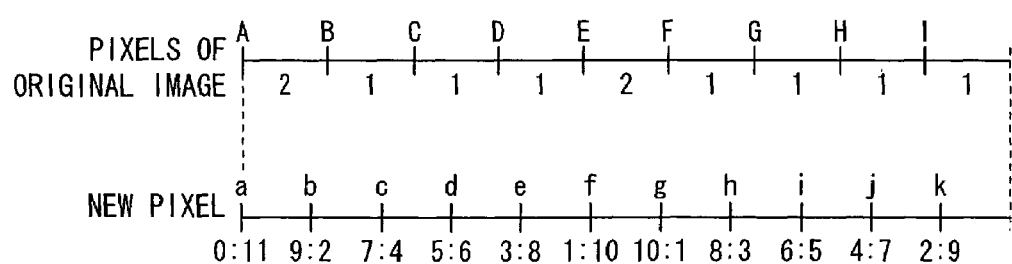
FIG. 14 illustrates, for reference, a magnification process according to the embodiment of the present invention.

FIG. 14 shows an example of the magnification process. Since this case considers an even number of pixels disposed in the horizontal direction and forming a pixel group of an original image, an end of the new-pixel-generating region viewed in the horizontal direction corresponds where the pixel group of the original image exists while the horizontal component in the new-pixel-generating position is disposed among the pixels of the original image. A magnification of the original image by 11/9 in a horizontal direction is equivalent to generating eleven new pixels from 9 pixels of the original image. Nine points (except for a right-most point) A to I dotted on an upper line shown in FIG. 14 indicate nine pixels of the original image. Eleven points (except for a right-most point) a to k dotted on a lower line shown in FIG. 14 indicate eleven new pixels.

The numbers in the vicinity of a line connecting the pixels of the original image (original pixel line) illustrated in an upper portion of the FIG. 13 indicate the number of pixels newly generated in one section between two pixels in the original image. For example, two new pixels a and b are generated between the pixels A and B. Also, the numbers in the vicinity of a line connecting the new pixels (new pixel line) illustrated in a lower portion of FIG. 14 indicate the internally dividing points (i.e., inner ratios of intervals) of the new pixels corresponding to each length of section (segment) on the lines of the original image illustrated in the upper portion of FIG. 14. In FIG. 14, with respect to the pixels of the new image, a breakpoint "a" at a left end of the new pixel line in the lower portion of FIG. 14 indicates that the breakpoint "a" divides the first line segment by the internal dividing ratio of 0:11. The numbers (ratios) described under the breakpoints "b" to "k" on the new pixel line indicate the inner ratios 9:2, 7:4, 5:6, 3:8, 1:10, 10:1, 8:3, 6:5, 4:7, 2:9 for each segment of the lines of the original image in the upper portion of FIG. 14.

The inner ratios indicate distance ratios for internally dividing one segment of the lines connecting the original pixels in the original image thereabove. In the method for obtaining interpolation coefficients that are multiplied by the pixel values of the pixels of the original image, distances between the new-pixel-generating position and the position of a pixel group of the original image are calculated based on the distance ratio, and otherwise, the interpolation coefficients are obtained by retrieving the interpolation coefficient pre-calculated based on the distance ratios.

Figure 15:
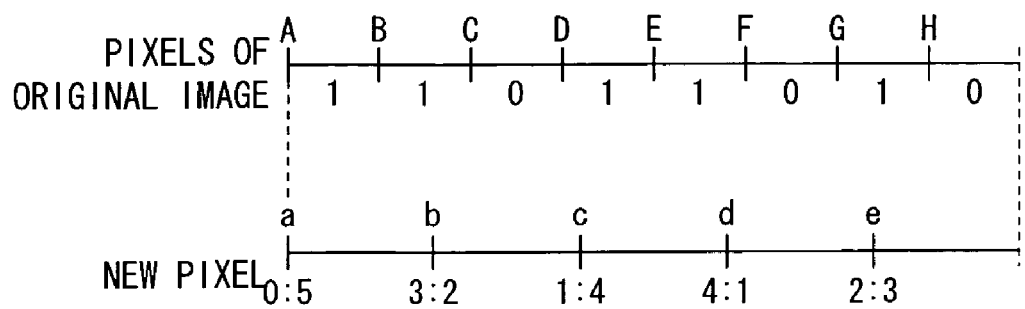
FIG. 15 illustrates, for reference, a reduction process according to the embodiment of the present invention.

FIG. 15 shows an example of a reduction process. A magnification of the original image by 5/8 in the horizontal direction is equivalent to generating five new pixels from 8 pixels of the original image. Eight breakpoints (except for a rightmost point) A to H dotted on a line shown in an upper portion of FIG. 15 indicate eight pixels of the original image. Five points (except for a rightmost point) "a" to "e" dotted on a line in a lower portion of FIG. 15 indicate five new pixels.

The numbers in the vicinity of a line connecting the pixels of the original image (original pixel line) illustrated in the upper portion of FIG. 15 indicate the number of pixels newly generated in one section between two pixels in the original image. Also, the numbers in the vicinity of a line connecting the new pixels (new pixel line) illustrated in a lower portion of FIG. 15 indicate the internally dividing points (i.e., inner ratios of intervals) of the new pixels corresponding to each length of section (segment) on the lines of the original image illustrated in the upper portion of FIG. 15. The breakpoint "a" in the leftmost end of the new pixel line in the lower portion of FIG. 15 is equivalent to a first internally dividing point in a segment of the lines of the original image in the upper portion of FIG. 15. The numbers (ratios) corresponding to the breakpoints "b" to "e" on the new pixel line indicate inner ratios 3:2, 1:4, 4:1, 2:3 of a segment of the lines of the original image illustrated in the upper portion of FIG. 15. The relationship between the inner ratio and the interpolation coefficient may be considered to be the same as the relationship shown in FIG. 14.

The basic idea of setting a new pixel is the same with respect to the horizontal direction and the vertical direction. However, since a point which divides the new-pixel-generating region in the vertical directions corresponds to a line on which the pixels of the original image exist (see FIG. 7) if the position of the middle point between pixels in the vertical direction corresponds to a margin of the new-pixel-generating region as shown in the present embodiment, the position of new pixel may be indicated by an inner ratio of a distance from a pixel on the line to a pixel disposed thereabove or therebeneath.

The pixel value of the new pixels in the case of the 12-point interpolation can be calculated by calculating the pixel values of the new pixels while maintaining the pixels of the original image in the pixel-values storage section 101 shown in FIG. 2, multiplying all the pixel values of the original image by the coefficients (coefficients corresponding to distances between new pixels with respect to twelve original pixels) corresponding to each pixel, and adding the calculated pixel values of the new pixels and the product of the multiplication.

Figure 16:
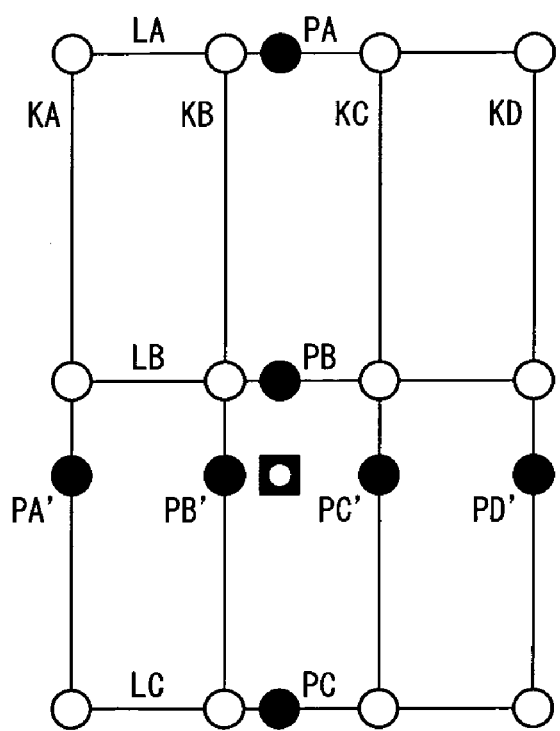
FIG. 16 illustrates, for reference, twelve-points interpolation by using twelve points around the new pixel according to the embodiment of the present invention.

FIG. 16 illustrates an example for conducting the 12-point-interpolation by using twelve pixels of the original image around the new pixels. "▣" indicates a new pixel and twelve pixels of the original image therearound are indicated by a reference symbol "○". Three segments LA, LB, LC each connect four points in respective horizontal directions in twelve pixels of the original image. Four segments KA, KB, KC, KD each connect three points in respective vertical directions in twelve pixels of the original image. Four new provisional pixels PA to PD are indicated as "●" disposed in the horizontal direction. The pixels PA to PD each coincide with the new pixels "●" with respect to the horizontal directions of the segments LA, LB, LC.

An interpolation formula is as follows for obtaining pixel values of one provisional new pixel PA (equivalent to "●" on the segment LA) from the pixel values (D11, D12, D13, D14) of four pixels P11, P12, P13, P14 (indicated as "○") of the original image disposed one-dimensionally on the segment LA in the horizontal direction. The interpolation pixel value DA of the provisional new pixel PA can be obtained by a calculation using the formula of $DA=\alpha 1 \cdot D11+\alpha 2 \cdot D12+\alpha 3 \cdot D13+\alpha 4 \cdot D14$ where $\alpha 1$, $\alpha 2$, $\alpha 3$, $\alpha 4$ (the sum of these parameters is 1) indicating the interpolation coefficients corresponding to the distances between the new pixel PA and four original pixels on the segment LA. The interpolation pixel values DB and DC corresponding to symbols "●" on the segments LB and LC in the horizontal direction can be calculated similarly.

An interpolated pixel value Q of the new pixel "●" can be obtained by a calculation using a formula of $Q=\beta 1 \cdot DA+\beta 2 \cdot DB+\beta 3 \cdot DC$ where $\beta 1$, $\beta 2$, $\beta 3$ (the sum of these parameters is 1) indicating the interpolation coefficients corresponding to the distances between the new pixel ▣ and three provisional new pixels PA, PB, PC on three vertically disposed horizontal lines. It should be noted that the parameters DA, DB, DC indicate pixel values of pixels PA, PB, PC. Four provisional new pixels PA' to PD' indicated by symbols "●" and disposed on the segments KA, KB, KC, KD are disposed in the same vertical positions in the horizontal direction and are disposed at the same vertical position as the new pixel "▣". The pixel values of the provisional new pixels PA', PB', PC', PD' may be calculated at first on the segments KA, KB, KC, KD instead of the above segments LA, LB, LC, and then the interpolated pixel value Q of the new pixel "▣" may be calculated.

A magnification of the original image by 11/9 in a horizontal direction is equivalent to generating eleven new pixels from 9 pixels of the original image. The reading-out of the pixel groups depends on a frequency corresponding to a difference, i.e., two pixels, and a position (more specifically, a first region and a fifth region) of the predetermined region (see FIG. 14). The above configurations may be applicable with respect to the vertical directions. As explained above, the same pixel group must be read repeatedly in the magnification process conducted in some regions. Therefore, instructions are necessary to repeat reading of the pixels group by group with respect to the horizontal direction and reading of the pixels lines by line with respect to the vertical direction.

Also, pixels to be newly generated do not exist in some regions in the reduction process. For example, a scale-reduction of the original image by 5/8 in a horizontal direction is equivalent to generating five new pixels from 8 pixels of the original image. New pixels to be generated do not exist in three regions corresponding to, more specifically, a third, a sixth, and an eighth line segment corresponding to the difference of the number of pixels i.e., three pixels. The above configurations may be applicable with respect to the vertical directions.

As explained above, pixels to be newly generated do not exist in some regions in the reduction process. Pixel values relating to pixels newly established in such regions must not be output to circuits disposed afterward. For example, more specifically, the following operations are necessary, i.e.: (1) the pixel groups themselves must not be outputted to the arithmetic interpolating section 104; (2) the pixel groups are outputted but the interpolations are not calculated in the arithmetic interpolating section 104; or (3) the interpolations of the pixel groups are calculated in the arithmetic interpolating section 104, but the output from there is blocked in the circuits disposed afterward. In order to provide such operations, instructions must therefore be executed to clarify that each pixel group has no pixels to be newly established in every pixel group in the horizontal direction and in every line in the vertical direction.

The region-determining section 102 as illustrated in the block diagram generates a region-control signal as a source of the above-explained instructions so that the region-control signal indicates, with respect to the horizontal direction and the vertical direction, whether or not a new-pixel-generating region should be moved and whether or not a new pixel should be established in the focused region. Also, the region-determining section 102 simultaneously outputs a newly-established-pixel-position signal which indicates a position of a pixel to be generated in the focused region.

Figure 3:
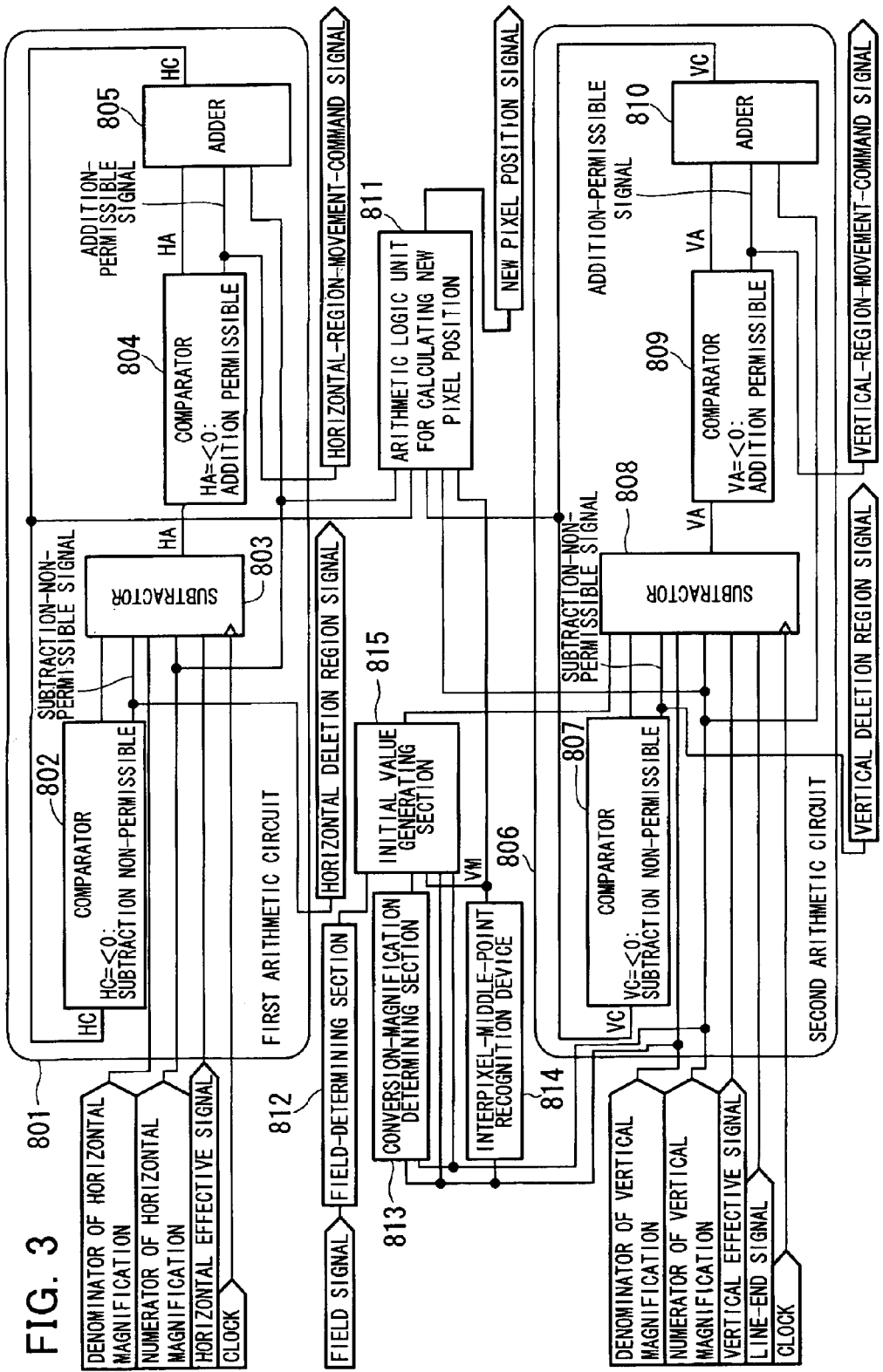
FIG. 3 is a block diagram of a region-determining section provided in the image resolution conversion apparatus according to the embodiment of the present invention.

The region-determining section 102 will be explained in detail with reference to FIG. 3. The region-determining section 102 comprises a first arithmetic circuit 801, a second arithmetic circuit 806, an arithmetic logic unit 811 for calculating a new pixel position, a field determination section 812, a conversion-magnification determining section 813, an interpixel-middle-point recognition device 814, and an initial-value-generating section 815. The first arithmetic circuit 801 generates a region-control signal (a horizontal deletion region signal and a horizontal-region-movement-command signal in the drawing) with respect to the horizontal direction. The second arithmetic circuit 806 generates a region-control signal (a vertical deletion region signal and a vertical-region-movement-command signal in the drawing) with respect to the vertical direction.

The arithmetic logic unit 811 for calculating new pixel position outputs a new-pixel-position signal which indicates a position of a pixel to be newly generated in the focused region. The field determination section 812 determines an odd field and an even field of the interlaced image. The conversion-magnification determining section 813 determines whether the converting of resolution may be a magnification process or reduction process. The interpixel-middle-point recognition device 814 allows the arithmetic logic unit 811 for calculating new pixel position and the initial-value-generating section 815 to recognize the interpixel-middle-point where the interpixel-middle-point coincides with a margin of the new-pixel-generating region as described in the present embodiment. The initial-value-generating section 815 generates initial values to be supplied to the second arithmetic circuit 806.

The first arithmetic circuit 801 will be explained in first. The first arithmetic circuit 801, illustrated in the block diagram, operative based on a clock timing of the horizontal effective period generates region-control signals including: a horizontal-region-movement-command signal for commanding to move the new-pixel-generating region in the horizontal direction based on the magnification/reduction ratio in the horizontal direction; and a horizontal deletion region signal which indicates a region where a pixel to be newly generated will not be necessary. The first arithmetic circuit 801 comprises a comparator 802, a subtractor 803, a comparator 804, and an adder 805.

In the present invention, a horizontal effective signal and a vertical effective signal indicates period during which a resolution conversion can be conducted.

The comparator 802 produces a subtraction-non-permissible signal and outputs it to the subtractor 803 disposed afterward, and activates the subtraction-non-permissible signal in a case where a parameter HC indicates zero or less supplied from the adder 805 disposed afterward. The output of subtraction-non-permissible signal may be similarly the horizontal deletion region signal which indicates whether or not a pixel should be newly generated in the focused region. The parameter HC is also inputted into the subtractor 803 without change.

The subtractor 803 operative with a clock timing outputs a parameter HA obtained by subtracting the value of a denominator of horizontal magnification from the parameter HC when the subtraction-non-permissible signal is inactive. The magnification ratio data input into the subtractor 803 are: the denominator value (denominator of horizontal magnification) of the magnification ratio data with respect to the horizontal direction; a numerator value (numerator of horizontal magnification); an input value HC; a horizontal effective signal; the subtraction-non-permissible signal; and a clock timing. The horizontal effective signal, generated based on the horizontal synchronous signals, has a delay in a portion for carrying out the resolution conversion.

The subtractor 803 sets an initial value of the numerator of horizontal magnification while the horizontal effective signal indicates invalid and outputs a parameter HA. The parameter HA output from the subtractor 803 is obtained by subtracting a value of the denominator of horizontal magnification from the parameter HC while the horizontal effective signal indicates valid and the subtraction-non-permissible signal is inactive. On the other hand, the subtractor 803 does not conduct a subtraction when the subtraction-non-permissible signal indicates active and outputs a parameter HA without changing the parameter HC.

The comparator 804 generates an addition-permissible signal from the parameter HA, outputs it to the adder 805, and activates the addition-permissible signal when the parameter HA indicates zero or less. The output of an addition-permissible signal may be a horizontal-region-movement-command signal which indicates whether or not the new-pixel-generating region should be moved. The parameter HA is also input into the adder 805 without change.

The adder 805 outputs a parameter HC obtained by adding a value of the numerator of horizontal magnification to the parameter HA when the addition-permissible signal is active. When the addition-permissible signal is inactive, the adder 805 outputs the parameter HC without changing the parameter HA.

The second arithmetic circuit 806 will be explained in next. The second arithmetic circuit 806 operative at the end of the horizontal line of the vertical effective period generates region-control signals including: a vertical-region-movement-command signal for commanding to move the new-pixel-generating region in the vertical direction based on the magnification/reduction ratio in the vertical direction; and a vertical deletion region signal which indicates a region where a pixel to be newly generated will not be necessary. The second arithmetic circuit 806 comprises a comparator 807, a subtractor 808, a comparator 809, and an adder 810.

The comparator 807 produces a subtraction-non-permissible signal, outputs it to the subtractor 808 disposed afterward, and activates the subtraction-non-permissible signal in a case where a parameter VC indicates zero or less supplied from the adder 810 disposed afterward. The output of subtraction-non-permissible signal may be similarly the vertical deletion region signal which indicates whether or not a pixel should be newly generated in the focused region. The parameter VC is also inputted into the subtractor 808 without change.

The subtractor 808 operative at the end of every horizontal line outputs a parameter VA obtained by subtracting the value of denominator of vertical magnification from the parameter VC when the subtraction-non-permissible signal is inactive. The magnification ratio data input into the subtractor 808 are: the denominator value (denominator of vertical magnification) of the magnification ratio data with respect to the vertical direction; a numerator value (numerator of a vertical magnification ratio); a parameter VC; a vertical effective signal; the subtraction-non-permissible signal; and a clock timing. The vertical effective signal, generated based on the vertical synchronizing signal, has a delay in a portion for carrying out the resolution conversion.

The subtractor 808 sets an initial value generated by the initial-value-generating section 815 while the vertical effective signal indicates invalid, and outputs the parameter VA. The parameter VA output from the subtractor 808 is obtained by subtracting a value of the denominator of vertical magnification from the parameter VC while the vertical effective signal indicates valid and the subtraction-non-permissible signal indicates inactive. On the other hand, the subtractor 808 does not conduct a subtraction when the subtraction-non-permissible signal indicates active and outputs a parameter VA without changing the parameter VC.

The comparator 809 generates an addition-permissible signal from the parameter VA, outputs it to the adder 810, and activates the addition-permissible signal when the parameter VA indicates zero or less. The output of addition-permissible signal may be a vertical-region-movement-command signal which indicates whether or not the new-pixel-generating region should be moved. The parameter VA is also input into the adder 810 without change.

The adder 810 outputs a parameter VC obtained by adding a value of the numerator of horizontal magnification to the parameter VA when the addition-permissible signal is active. When the addition-permissible signal is inactive, the adder 810 outputs the parameter VC without changing the parameter VA. The parameters VA and VC may be indicated by a stepwise unit, i.e., 1/2. In order to enable the circuits of the present invention to handle these parameters, the parameters have a bit for indicating a radix point.

The arithmetic logic unit 811 for calculating a new pixel position calculates the position of a pixel to be newly generated in the focused region from the numerator of horizontal magnification, the numerator of a vertical magnification ratio, the parameter HC, the parameter VC, and the parameter VM output from an interpixel-middle-point recognition device 814 which will be explained later. The pixel to be newly generated from 3 lines by 4 columns of twelve pixels in an original image is located in a region surrounded by four middle points between P12 and P22, between P13 and P23, between P22 and P32, and between P23 and P33. Outputs from the arithmetic logic unit 811 for calculating new pixel position are: a position of the new pixel from a rightmost end of the four-point-surrounding region with respect to the horizontal direction; and a position of the new pixel from a center of the four-point-surrounding region with respect to the vertical direction.

The position from the rightmost end with respect to the horizontal direction is indicated by an HC/numerator of a horizontal magnification ratio. The position from the center with respect to the vertical direction is indicated by a (VC−VM)/numerator of a vertical magnification ratio. The arithmetic logic unit 811 for calculating the new pixel position outputs the new-pixel-position signal after executing the subtractions. In this regard, the division may not be executed and parameters HC and (VC−VM) indicative of locations of the new pixel may be output in order to retrieve coefficient data corresponding to the location from the memories in the interpolating calculations conducted afterward.

The field determination section 812 determines whether the externally input field signal belongs to an odd field or an even field and outputs a field-determining signal to an initial-value-generating section 815. The conversion-magnification determining section 813 determines whether the resolution conversion is a magnification process or a reduction process based on the denominator value (denominator of vertical magnification) of the magnification ratio data with respect to the vertical direction and the numerator value (numerator of a vertical magnification ratio), and outputs the conversion-magnification determining signal to the initial-value-generating section 815.

The interpixel-middle-point recognition device 814 for generating the parameter VM relating to the interpixel-middle-point outputs a parameter VM indicative of numerator of a vertical magnification ratio/2 in a case where the number of lines in the pixel group of the original image used for generating the new pixel indicates an odd number (e.g. the pixel group of the original image consists of 3 lines by 4 columns). The interpixel-middle-point recognition device 814 outputs the parameter VM indicative of zero if the number of pixel groups of the original image used for generating the new pixel indicates an even number. The parameter VM output from the interpixel-middle-point recognition device 814 is supplied to the initial-value-generating section 815 and to the arithmetic logic unit 811 for calculating the new pixel position. If the lines in the pixel group of the original image are odd in number, the initial values are offset by executing a formula: denominator of vertical magnification/2, and a region where a new pixel is to be generated will be shifted over intermediate points of the existing pixels in the focused field. The shifting represents a switching of the new-pixel-generating region to a new location, and in this state, the vertical-region-movement-command signal becomes active.

Meanwhile, the parameter VM is provided with one bit for indicating an arithmetic point and a fractional part for a case where the denominator of vertical magnification is odd in number. The interpixel-middle-point recognition device 814 provided to the present embodiment varies the output value of the parameter VM in accordance with as to whether the lines in the pixel group of the original image are odd or even in number in order to handle both cases.

The initial-value-generating section 815 generates the initial values of the parameter VA output from the subtractor 808 based on the field-determining signal, the conversion-magnification determining signal, the denominator of vertical magnification, the numerator of a vertical magnification ratio, and the parameter VM relating to the interpixel-middle-point.

The initial values of the parameter VA are set in accordance with the field-determining signal and the conversion-magnification determining signal as follows.

the magnification process is indicated by the conversion-magnification determining signal
the field-determining signal is odd in field.
The initial values VA are indicated by executing a formula:

((numerator of a vertical magnification ratio+denominator of vertical magnification)/2−VM).

the field-determining signal is even in field.
The initial values VA are indicated by executing a formula:

(numerator of a vertical magnification ratio−VM).

the conversion-magnification determining signal does not indicate the magnification process
the field-determining signal is odd in field.
The initial values VA are indicated by executing a formula:

(numerator of a vertical magnification ratio−VM).

the field-determining signal is even in field.
The initial values VA are indicated by executing a formula:

((3*numerator of a vertical magnification ratio−denominator of vertical magnification)/2−VM).

Since the calculation for obtaining the initial values of the parameter VA includes 1/2× magnification, if both the denominator of vertical magnification and numerator of a vertical magnification ratio are not odd in numbers, the obtained values may not be indicated by integers. In order to enable the initial values for generating the parameter VA, these parameters have a bit for indicating a radix point. Data, i.e., the input of magnification ratio data are set in registers by means of a CPU. Also, the horizontal effective signal, the vertical effective signal, the line-end signal, and the field signal may be signals supplied from a timing generator. Frequency of the clock signal is not limited to a particular range as long as the circuits are operable properly.

The initial values of the parameter VA vary depending on the field, i.e., odd or even so that each pixel to be newly generated in each focused field should have regular intervals when viewed in a frame. An axiom will be explained as follows.

Figure 17:
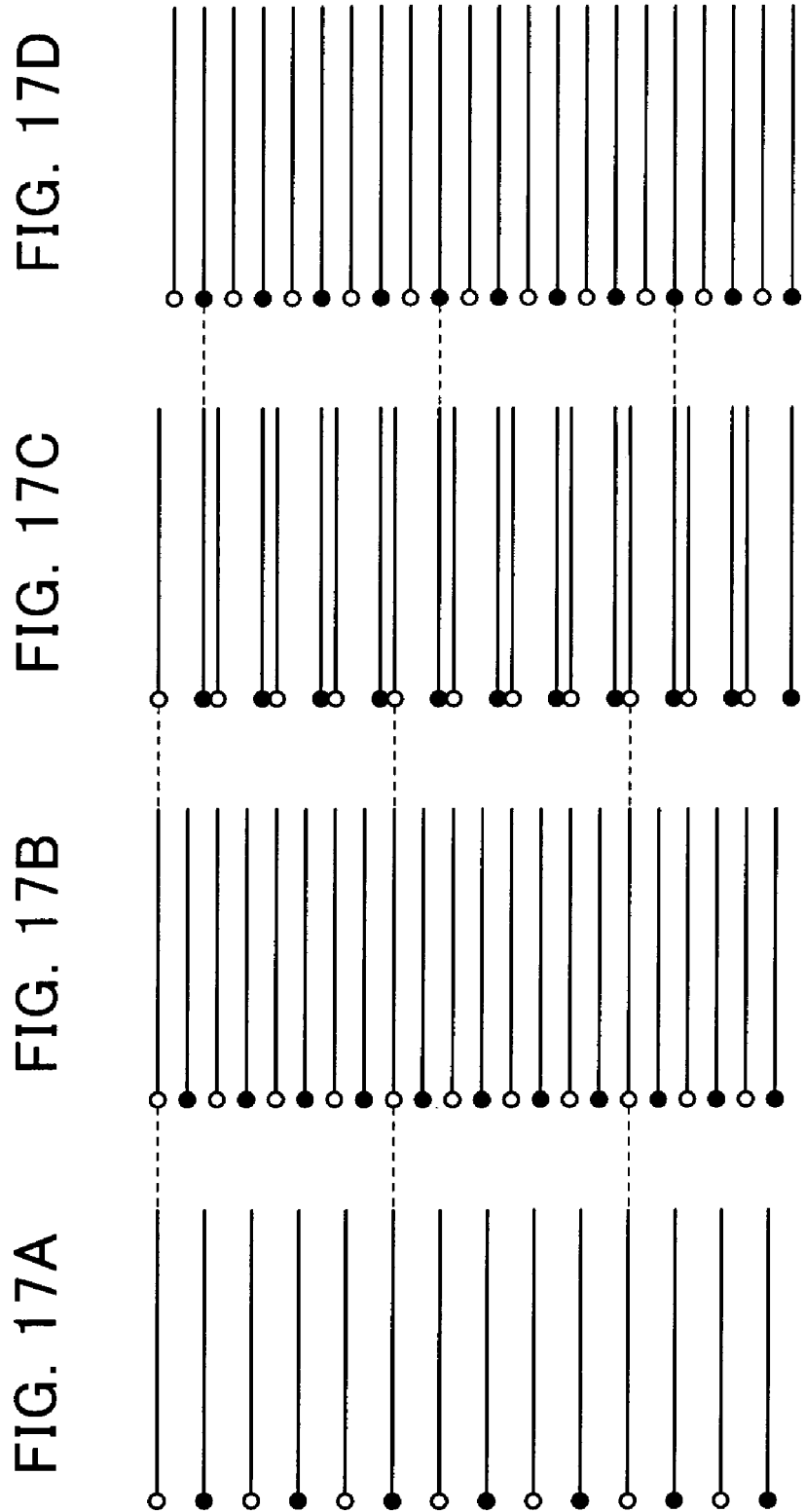
FIGS. 17A to 17D illustrate, for reference, line positions before and after a resolution conversion according to the embodiment of the present invention.
Figure 18:
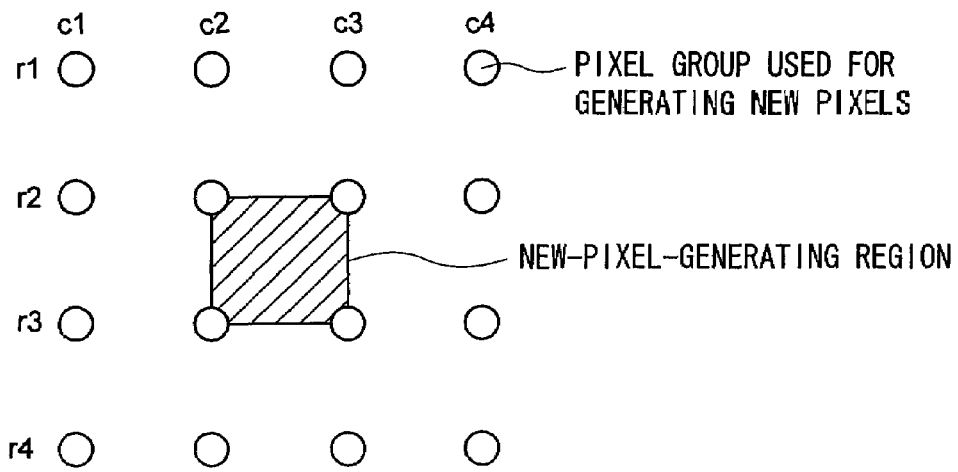
FIG. 18 illustrates, for reference, a new-pixel-generating region and a pixel group used for generating the new pixel in the conventional image resolution conversion.
Figure 19:
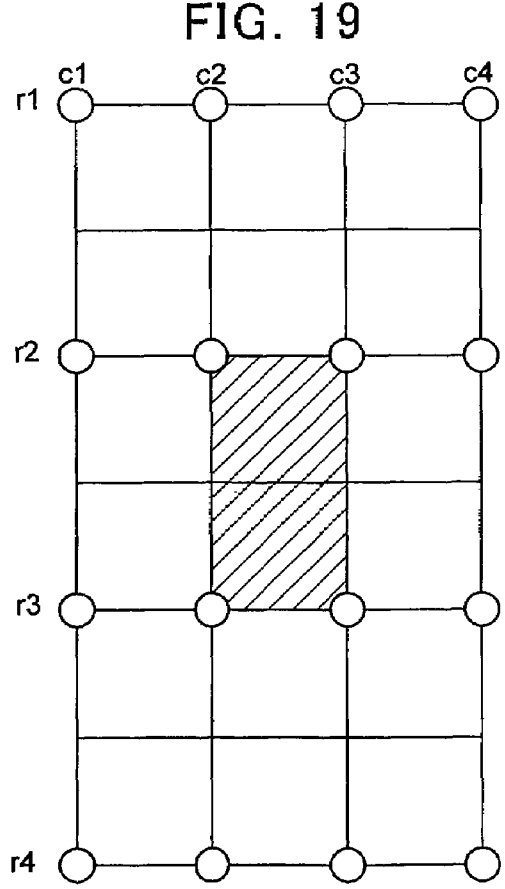
FIG. 19 illustrates, for reference, the conventional image resolution conversion.

FIG. 17A illustrates line positions of the original image where "○" indicates lines obtained in the odd fields and "●" indicates lines obtained in the even fields. FIG. 17B illustrates positions of lines to be interpolated when 8/5× magnification of resolution conversion is carried out in the vertical direction. FIG. 17C illustrates lines having interpolated pixel data in the 8/5× magnification of resolution conversion in the vertical direction when the conversion process is carried out by using the same initial values of parameter VM in the odd field and even field of an interlace mode.

As shown in FIG. 17C, the lines are generated with equal intervals therebetween with respect to the fields. However, the intervals among the odd fields and the even fields are not equal when both of the fields are integrated. This is because the positions of the interpolated lines generated in the even field start with line positions of the even field of the original image. As a result, the intervals among lines of the odd field and the lines of the even field remain the same as prior to the resolution conversion.

Therefore, it is necessary to shift the position of the interpolated line disposed first in the even fields upwardly so that the generating of the interpolated lines may start from the positions shown in FIG. 17B. However, in the case of the conversion for magnifying the resolution, if the interpolated lines of the even fields are generated in the positions shown in FIG. 17B, the positions of the first-generated interpolated lines are shifted more upwardly than a starting line of the original image undesirably. Therefore, there are not enough pixels around the pixels of the original image when interpolating the lines to a desirable position.

To address this situation, the interpolated lines are generated by correcting the positions of the interpolated lines in each field as illustrated in FIG. 17D. Meanwhile, in the case of resolution conversion in the reducing process, since the position of the first-generated interpolated line is disposed lower than the first line of the original image, the position of the first interpolated line in the even field may have to be shifted upward.

Operations in the first arithmetic circuit 801 and the second arithmetic circuit 806 will be explained with reference to an example of magnification ratio data: 11/9× magnification ratio. The first arithmetic circuit 801 will be explained in first. The horizontal effective signal indicates invalid only at the first clock signal and indicates valid afterward. The subtractor 803 becomes operative first, followed by the comparator 804, the adder 805, and the comparator 802. The sequence of operations until next time the subtractor 803 becomes operative indicates one clock period.

The comparator 803: an initial value 11 (numerator of horizontal magnification) is set and output from here.

The comparator 804: the addition-permissible signal becomes inactive because 11 is not less than zero.

The adder 805: 11 is output without change because the addition-permissible signal is inactive.

The comparator 802: the subtraction-non-permissible signal becomes inactive because 11 is not less than zero.

The subtractor 803: 2 obtained by subtracting 9 from 11 is output because the subtraction-non-permissible signal is inactive.

The comparator 804: the addition-permissible signal becomes inactive because 2 is not less than zero.

The adder 805: 2 is output without change because the addition-permissible signal is inactive.

The comparator 802: the subtraction-non-permissible signal becomes inactive because 2 is not less than zero.

The subtractor 803: −7 obtained by subtracting 9 from 2 is output because the subtraction-non-permissible signal is inactive.

The comparator 804: the addition-permissible signal becomes active because −7 is less than zero.

The adder 805: 4 obtained by adding 11 to −7 (numerator of horizontal magnification) is output because the addition-permissible signal is active.

The comparator 802: the subtraction-non-permissible signal becomes inactive because 4 is not less than zero.

The subtractor 803: −5 obtained by subtracting 9 from 4 is output because the subtraction-non-permissible signal is inactive.

The comparator 804: the addition-permissible signal becomes active because −5 is less than zero.

The adder 805: 6 obtained by adding 11 to −5 (numerator of horizontal magnification) is output because the addition-permissible signal is active.

The same operations are repeated.

The outputted values from the adder 805 are 2, 4, 8, 10, 1, 3, 5, 7, 9, and 11 after the horizontal effective signal is valid; thus, 11 clocks indicate one routine of the outputted values with respect to the clock period. Also, the addition-permissible signal and the horizontal-region-movement-command signal become inactive in a second clock period outputting 2 and in a sixth clock period outputting 1. The new-pixelgenerating region does not move in this state, that is, a new pixel is generated in the same region. On the other hand, the subtraction-non-permissible signal and the horizontal deletion region signal are consistently inactive. Therefore, the new pixels are necessary to be established in every region.

The operation of the second arithmetic circuit 806 will be explained in next. In this context, the vertical effective signal indicates invalid only in a first line period and indicates valid afterward. The subtractor 808 becomes operative first, followed by the comparator 809, the adder 810, and the comparator 807. The sequence of operations until next time the subtractor 808 becomes operative indicates one clock period. Also, the operation in a case of an odd field in the interlace mode will be explained.

The field determination section 812: the field is determined as odd.

The conversion-magnification determining section 813: compares 11 as the numerator of a vertical magnification ratio with 9 as the denominator of vertical magnification and determines the process as magnification.

The interpixel-middle-point recognition device 814: multiplying 9 as the numerator of a vertical magnification ratio by 1/2 and outputs 4.5.

The initial-value-generating section 815: obtains the initial value 5.5 by conducting a formula: (11+9)/2−4.5 wherein 11 indicates the numerator of a vertical magnification ratio, 9 indicates a denominator of vertical magnification, and 4.5 indicates VM since the magnification is subject to the odd field in the interlace mode.

The subtractor 808: an initial value 5.5 generated by the initial-value-generating section 815 is established and output from here.

The comparator 809: the addition-permissible signal becomes inactive because 5.5 is not less than zero.

The adder 810: 5.5 is output without change because the addition-permissible signal is inactive.

The comparator 807: the subtraction-non-permissible signal becomes inactive because 5.5 is not less than zero.

The subtractor 808: −3.5 obtained by subtracting 9 (denominator of vertical magnification) from 5.5 is output because the subtraction-non-permissible signal is inactive.

The comparator 809: the addition-permissible signal becomes active because −3.5 is less than zero.

The adder 810: 7.5 obtained by adding 11 to −3.5 is output because the addition-permissible signal is active.

The comparator 807: the subtraction-non-permissible signal becomes inactive because 7.5 is not less than zero.

The subtractor 808: −1.5 obtained by subtracting 9 (denominator of vertical magnification) from 7.5 is output because the subtraction-non-permissible signal is inactive.

The comparator 809: the addition-permissible signal becomes active because −1.5 is less than zero.

The adder 810: 9.5 obtained by adding 11 to −1.5 (numerator of a vertical magnification ratio) is output because the addition-permissible signal is active.

The comparator 807: the subtraction-non-permissible signal becomes inactive because 9.5 is not less than zero.

The subtractor 808: 0.5 obtained by subtracting 9 (denominator of vertical magnification) from 9.5 is output because the subtraction-non-permissible signal is inactive.

The comparator 809: the addition-permissible signal becomes inactive because 0.5 is not less than zero.

The adder 810: 0.5 is output without change because the addition-permissible signal is inactive.

The comparator 807: the subtraction-non-permissible signal becomes inactive because 0.5 is not less than zero.

The subtractor 808: −8.5 obtained by subtracting 9 (denominator of vertical magnification) from 0.5 is output because the subtraction-non-permissible signal is inactive.

The comparator 809: the addition-permissible signal becomes active because −8.5 is less than zero.

The adder 810: 2.5 obtained by adding 11 to −8.5 (numerator of a vertical magnification ratio) is output because the addition-permissible signal is active.

The same operations are repeated.

The outputted values from the adder 810 are 7.5, 9.5, 0.5, 2.5, 4.5, 6.5, 8.5, 10.5, 1.5, 3.5, and 5.5 with respect to the line period after the vertical effective signal is valid. Thus, 11 clock periods indicate one routine. Also, the addition-permissible signal and the horizontal-region-movement-command signal become inactive in a third clock period outputting 0.5 and in a ninth clock period outputting 1.5. The new-pixel-generating region does not move in this state, that is, a new pixel is generated in the same region. On the other hand, the subtraction-non-permissible signal and the horizontal deletion region signal are consistently inactive. Therefore, the new pixels are necessary to be established in every region.

Furthermore, supplementary examples are provided for initial values used as parameters VA subjected to specific magnification ratio in each field.

the magnification ratio is 11/9
the odd field: the initial value of VA is 5.5.
the even field: the initial value of VA is 6.5.
the magnification ratio is 5/8
the odd field: the initial value of VA is 2.5.
the even field: the initial value of VA is 1.

Figure 4:
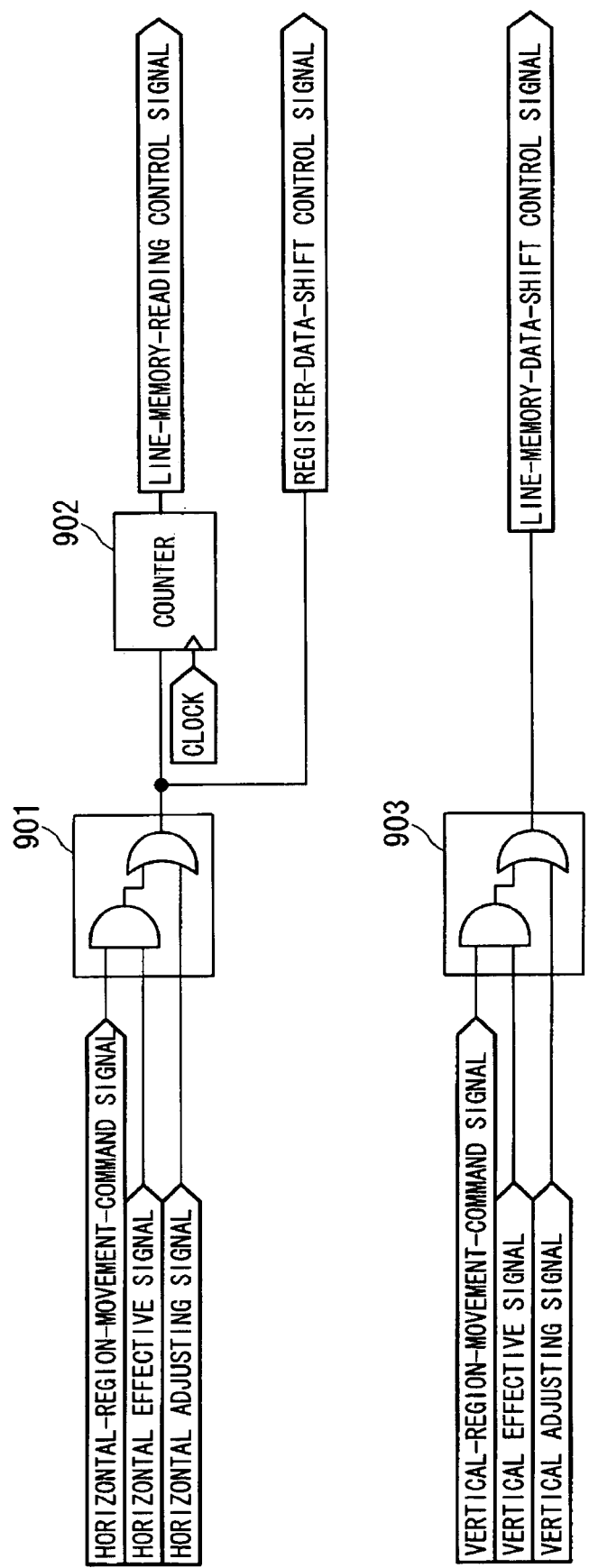
FIG. 4 is a block diagram of a pixel-values-reading control section provided in the image resolution conversion apparatus according to the embodiment of the present invention.

The configuration of the pixel-values-reading control section 103 will be explained in next with reference to FIG. 4. In the drawing, a reference symbol 901 indicates an adjusting logic circuit in the horizontal direction, a reference symbol 902 indicates a counter for counting the number of signals supplied from the adjusting-logic circuit 901, and a reference symbol 903 indicates an adjusting logic circuit in the vertical direction.

The signals (the line-memory-reading control signal, the register-data-shift control signal, and the line-memory-data-shift control signal) generated by the pixel-values-reading control section 103 basically follow the horizontal-region-movement-command signal output from the region-determining section 102 in the horizontal effective period and the vertical-region-movement-command signal output from the region-determining section 102 in the vertical effective period. On the other hand, adjustments may be necessary in some regions, i.e., marginal sections of the image so that the interpolation should not be calculated. Provided for such a purpose are the adjusting-logic circuits 901 and 903 so that the horizontal-region-movement-command signal and the vertical-region-movement-command signal should be adjusted based on a horizontal adjustment signal and a vertical adjustment signal. The horizontal adjusting signal and the vertical adjusting signal are generated based on signals, i.e., the horizontal effective signal and the vertical effective signal in consideration of the regions to be subjected to the interpolating calculation.

The output from the adjusting-logic circuit 901 becomes the register-data-shift control signal. The register-data-shift control signal is also input into the counter 902, and the signals are incremented while the signals are active. The output from the counter 902 becomes the line-memory-reading control signal as an address value to be read by the line memories 202 to 204. On the other hand, the output from the adjusting logic circuit 903 becomes the line-memory-data-shift control signal. Only major control signals, i.e., for reading the pixel values, are shown in the explanation of the present invention. For example, explanations for signals, i.e., read-enabling signals, are omitted.

Figure 5:
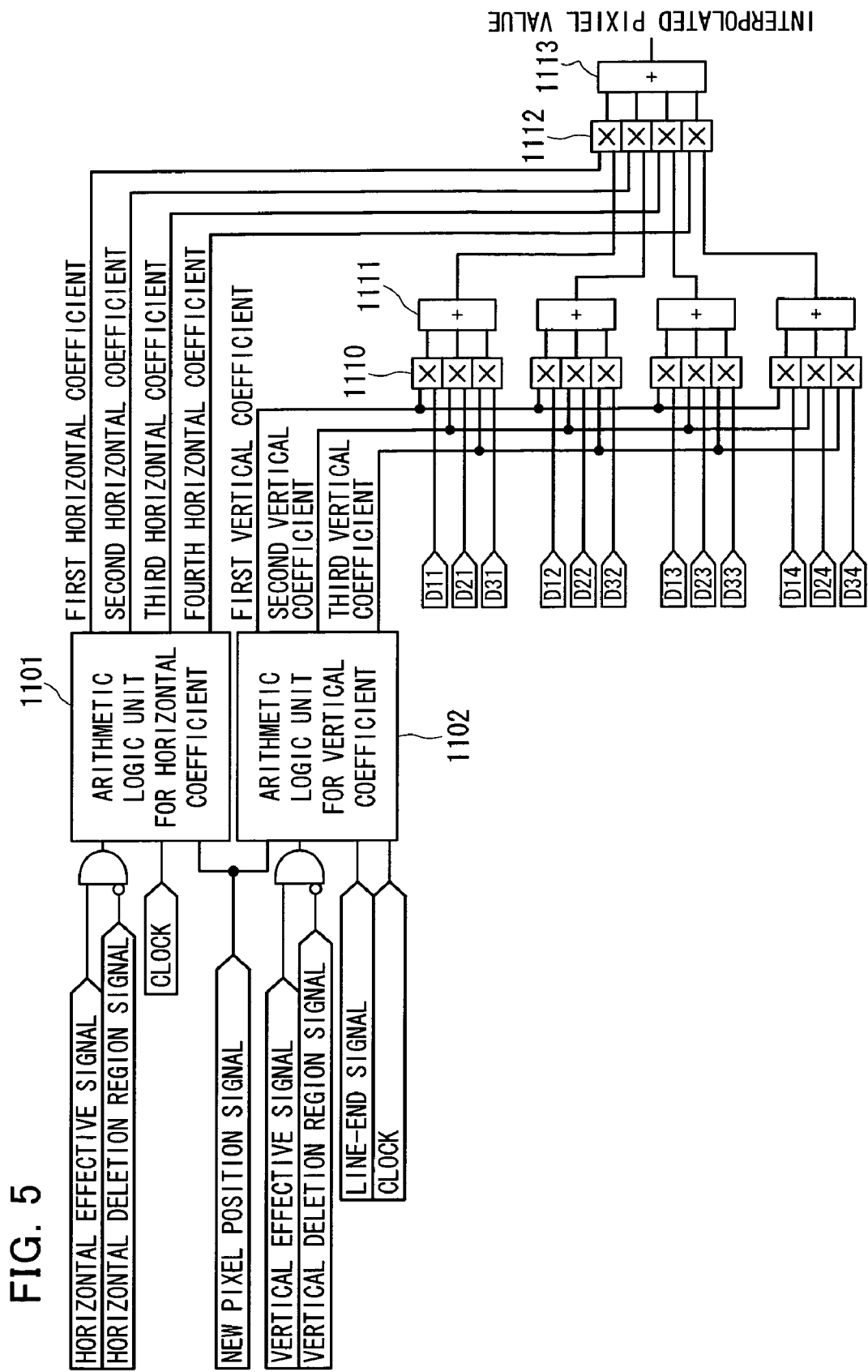
FIG. 5 is a block diagram of a arithmetic interpolating section provided in the image resolution conversion apparatus according to embodiment of the present invention.

The configuration of the arithmetic interpolating section 104 will be explained with reference to FIG. 5 in next. A horizontal arithmetic logic unit 1101 operative with a clock timing while the horizontal effective signal is active and the horizontal deletion region signal is inactive calculates and outputs an interpolation coefficient with respect to the horizontal direction, i.e., a first horizontal coefficient, a second horizontal coefficient, a third horizontal coefficient, and a fourth horizontal coefficient based on the horizontal components positioned at the new pixel included in the new-pixel-position signal. In the above calculations, horizontal components may be obtained in the distance between four pixels disposed in the horizontal direction of the original image and the new pixel, and then the coefficient values to be multiplied by four pixels may be calculated based on the horizontal components of the distances. Alternatively, pre-calculated coefficient values may be stored in memories and the coefficients may be retrieved based on the horizontal components of the new pixel positions.

A vertical arithmetic logic unit 1102 operative with a clock timing while the line-end signal is active, the vertical effective signal is active, and the vertical deletion region signal is inactive, calculates and outputs an interpolation coefficient with respect to the vertical direction, i.e., a first vertical coefficient, a second vertical coefficient, and a third vertical coefficient based on the vertical components positioned at the new pixel included in the new-pixel-position signal. In the above calculations, vertical components may be obtained in the distances between three pixels disposed in the vertical direction of the original image and the new pixel, and then the coefficient values to be multiplied by three pixels may be calculated based on the vertical components of the distances. Alternatively, pre-calculated coefficient values may be stored in memories and the coefficients may be retrieved based on the vertical components of the new pixel positions.

The multiplier 1110, the adder 1111, the multiplier 1112, and the adder 1113 calculate the pixel values of the new pixel based on four horizontal interpolation coefficients with respect to the horizontal direction, three vertical interpolation coefficients with respect to the vertical direction, and pixel values D11, D12, D13, D14, D21, D22, D23, D24, D31, D32, D33, D34 included in the group of twelve original image pixels.

As explained above, the region-determining section 102 provided in the image resolution conversion apparatus according to the present embodiment establishes the initial values (VA initial values) used for determining the new-pixel-generating region based on the number of pixels in a non-line direction included in the pixel group used for the resolution conversion (i.e., as to whether the pixels are odd or even in number), attribute of fields (even field type or odd field type), and the resolution conversion magnification ratio. The region-determining section 102 simultaneously accumulates integration parameters (the numerator of horizontal magnification, the denominator of horizontal magnification, the numerator of a vertical magnification ratio, and the denominator of vertical magnification) corresponding to the resolution conversion magnification ratio onto the established initial values successively under the predetermined condition (note that negative values are added in a case of subtraction). The region-determining section 102 outputs: the first determination signal (deletion-region signal and region-movement-command signal) associated with the position of the new-pixel-generating region successively based on the accumulation result; and the second determination signal (new-pixel-position signal) associated with the position of the new pixel to be generated in the new-pixel-generating region.

In order to dispose the 3 lines by 4 columns of a pixel group in the original image as previously explained, the new-pixel-generating region must be set so intermediate points among the pixels of the original image in a non-line direction coincide with a margin of the focused region. The pixel group of the original image can be established so that directions with respect to both the line direction and the non-line direction may be close in a distribution range of the pixel group of the original image used for generating the new pixel when the original image is viewed while combining both the odd field and the even field since the new-pixel-generating region is established in a preferable location corresponding to the initial values in the present embodiment; therefore, the resolution-converted interlaced image quality can be improved.

Also, the number of pixels in the pixel group in the non-line direction is a sum of 1 and a quotient obtained by dividing the number of pixels in line directions by 2 according to the present embodiment. Furthermore, the pixel-values storage section 101 collectively outputs pixel values of the pixel group corresponding to the number of a product of the number of pixels in the line direction and the number of pixels in the non-line direction. This configuration provides the resolution conversion using each pixel value in the pixel group of the original image so that the differences between the distances of the distributing range of the pixel group of the original image with respect to the line direction and the non-line direction may be one pixel or smaller when viewing the original image while combining the odd field and the even field.

Also, according to the present embodiment, the intermediate position parameter (VM) which indicates an intermediate position between the pixels adjacent to each other in the non-line direction in an image per field is established based on the resolution conversion magnification ratio, and the initial values and the second determination signal are generated based on the intermediate position parameters. This configuration can provide the new-pixel-generating region having two intermediate points between pixels, i.e., two ends, one of which corresponds to a pixel not existing in one field and another one of which corresponds to a pixel existing in another field included in the interlaced image. Accordingly, the new-pixel-generating region can be located in the center of the pixel group of the original image in a case where the pixels (line number) in a non-line direction included in the pixel group of the original image used for generating the new pixel are odd in number.

The embodiments of the present invention have been explained above in detail with reference to the drawings. However, it should be understood that the drawings and detailed description thereto are not intended to limit the invention to the particular form disclosed; thus, the invention disclosed herein is susceptible to various modifications and alternative forms, i.e., design changes.

The pixel group of the original image can be established so that directions with respect to both the line direction and the non-line direction may be close in a distribution range of the pixel group of the original image used for generating the new pixel when the original image is viewed while combining both the odd field and the even field since the new-pixel-generating region is established in a preferable location corresponding to the initial values in the present embodiment; therefore, an effect can be obtained such that the resolution-converted interlaced image quality can be improved.

What is claimed is:

1. An image resolution conversion apparatus for converting an original image into an image having a resolution corresponding to a preset resolution conversion magnification ratio by generating a new pixel by interpolating pixel values relating to a plurality of pixels included in a pixel group forming a predetermined size of pixel region, the apparatus comprising:

a pixel-values storage section for storing the pixel values of each interlaced input original image as a unit of an interlaced field;

a region-determining section for setting initial values used for determining a new-pixel-generating region; accumulating onto the initial values integration parameters corresponding to the resolution conversion magnification ratio successively under a predetermined condition; and outputting a first determination signal and a second determination signal successively based on the accumulation results, the initial values being set based on the number of pixels in the pixel group in a non-line direction orthogonal to a line direction of interlacing, the attribute of fields, and the resolution conversion magnification ratio, the first determination signal relating to the position of the new-pixel-generating region for generating the new pixel, and the second determination signal relating to the position of the new pixel in the new-pixel-generating region;

a pixel-values-reading control section for generating an output-control signal based on the first determination signal, the output-control signal allowing the pixel values of the pixel group corresponding to the new-pixel-generating region output from the pixel-values storage section;

an arithmetic interpolating section for calculating an interpolated pixel value of the new pixel corresponding to the resolution conversion magnification ratio based on the pixel values of the pixel group and the second determination signal, the pixel values being output from the pixel-values storage section in accordance with the output-control signal;

wherein the number of pixels in the pixel group in the non-line direction is obtained from a sum of 1 and a quotient obtained by dividing the number of pixels in line directions by 2, and the pixel-values storage section collectively outputs pixel values of the pixel group corresponding to the number of a product of the number of pixels in a line direction and the number of pixels in the non-line direction.

2. The image resolution conversion apparatus according to claim 1, wherein the region-determining section establishes an intermediate position parameter indicating an intermediate position between pixels adjacent in the non-line direction to each other in the field and generates the initial values and the second determination signal based on the intermediate position parameter.

* * * * *